United States Patent [19]

Costantino et al.

[11] 4,276,472
[45] Jun. 30, 1981

[54] DETECTOR FOR Q-SWITCHED LASER RADIATION

[75] Inventors: Joseph A. Costantino, Morrisville; Jeffrey R. Heberley, East Stroudsburg; Jerry Neimark, Philadelphia; Thomas E. Weiner, Bensalem, all of Pa.

[73] Assignee: The United States of America as represented by the Secretary of the Army, Washington, D.C.

[21] Appl. No.: 84,704

[22] Filed: Oct. 15, 1979

[51] Int. Cl.³ .............................................. H01J 40/14
[52] U.S. Cl. .......................... 250/214 B; 250/214 RC
[58] Field of Search ........ 250/214 R, 214 RC, 214 B, 250/208, 209, 210, 562, 563

[56] References Cited
U.S. PATENT DOCUMENTS

| 3,400,270 | 9/1968 | Durig | 250/214 RC |
| 3,660,670 | 5/1972 | Howard | 250/214 RC |
| 4,032,777 | 6/1977 | McCaleb | 250/214 B |

Primary Examiner—David C. Nelms
Attorney, Agent, or Firm—Nathan Edelberg; Robert P. Gibson; Max Yarmovsky

[57] ABSTRACT

A detector for detecting radiation from a Q-switched laser. The detector comprises a plurality of silicon photo-diodes (10) which develop an output signal when struck by incident radiation from the Q-switched laser. The output of the photo-diodes is connected to a pulse-width discriminator (12) and a pulse-amplitude discriminator (13). The pulse-width discriminator generates an output signal only if the amplitude of the output pulse from the photo-diodes is less than 300 nanoseconds, signifying an input pulse from a Q-switched laser. The pulse-amplitude discriminator develops an output signal only when the photo-diode is saturated, again, indicating radiation from a Q-switched laser. The presence of a signal from either the pulse-width discriminator or the pulse-amplitude discriminator indicates that the incident radiation on the photo-diode was indeed from a Q-switched laser.

6 Claims, 2 Drawing Figures

DETECTOR FOR Q-SWITCHED LASER RADIATION

GOVERNMENTAL INTEREST

The invention described herein may be manufactured, used and licensed by or for the Government for Governmental purposes without the payment to us of any royalties thereon.

TECHNICAL FIELD

Broadly speaking, this invention relates to lasers. More particularly, in a preferred embodiment, this invention relates to methods and apparatus for detecting radiation from a Q-switched laser.

BACKGROUND OF THE INVENTION

Detectors for detecting the presence of laser radiation are commercially available and have been widely discussed in the literature. A problem arises, however, when the radiation to be detected originates in a high power, Q-switched laser, for example, a neodymium laser operating at a wavelength of 1.06 $\mu$m.

More specifically, detectors for detecting Q-switched laser radiation invariably include some sort of pulse-width discriminator circuit in order that any light pulse having a duration which is greater than 300 nanoseconds, say, will be rejected, since such a pulse cannot possibly originate in a Q-switched laser. However, if by chance the detector happens to be positioned in the path of the main laser beam, the detector will saturate, producing an output pulse having a duration which is too long for the pulse-width discriminator to process; thus, the pulse will not be detected, resulting in error.

Various complex and elaborate schemes have been used in the prior art in an attempt to overcome this problem. For example, circuits have been built which attempt to discriminate against the rise time of the input pulse, or which compare the ratio of pulse rise and fall time to pulse width. However, in either case, an engineering trade-off is made which sacrifices either sensitivity, dynamic range, or the false alarm rate.

SUMMARY OF THE INVENTION

The problem, then, is to provide a detector for Q-switched laser radiation that is reliable, inexpensive, and which has both a wide dynamic range and a virtually zero false alarm rate while at the same time overcoming all the deficiencies of the prior art. Fortunately, the invention to be described below comprises a solution to these and other problems.

In a preferred embodiment, the instant invention comprises an apparatus for detecting radiation from a Q-switched laser, which comprises at least one photo-detector for developing a first output signal in response to incident optical radiation falling thereon; means connected to the photo-detector for comparing the first output signal with a known reference potential thereby to generate a second output signal if the first output signal exceeds the reference potential; a pulse width discriminator connected to the output of the comparing means for generating a third output signal if the second output signal has a duration which is less than a predetermined time interval; a pulse amplitude discriminator connected to the comparing means for generating a fourth output signal if the second output signal exceeds a predetermined amplitude; and means, responsive to either the first or the fourth output signal, for generating a fifth output signal indicative of optical radiation from a Q-switched laser, the fifth output pulse generating means generating a pulse having a duration substantially greater than the duration of the pulse generated by the comparing means.

The invention, and its mode of operation, will be more fully understood from the following detailed description, when taken with the attendant drawings in which:

DETAILED DESCRIPTION OF THE INVENTION

Figure 1:
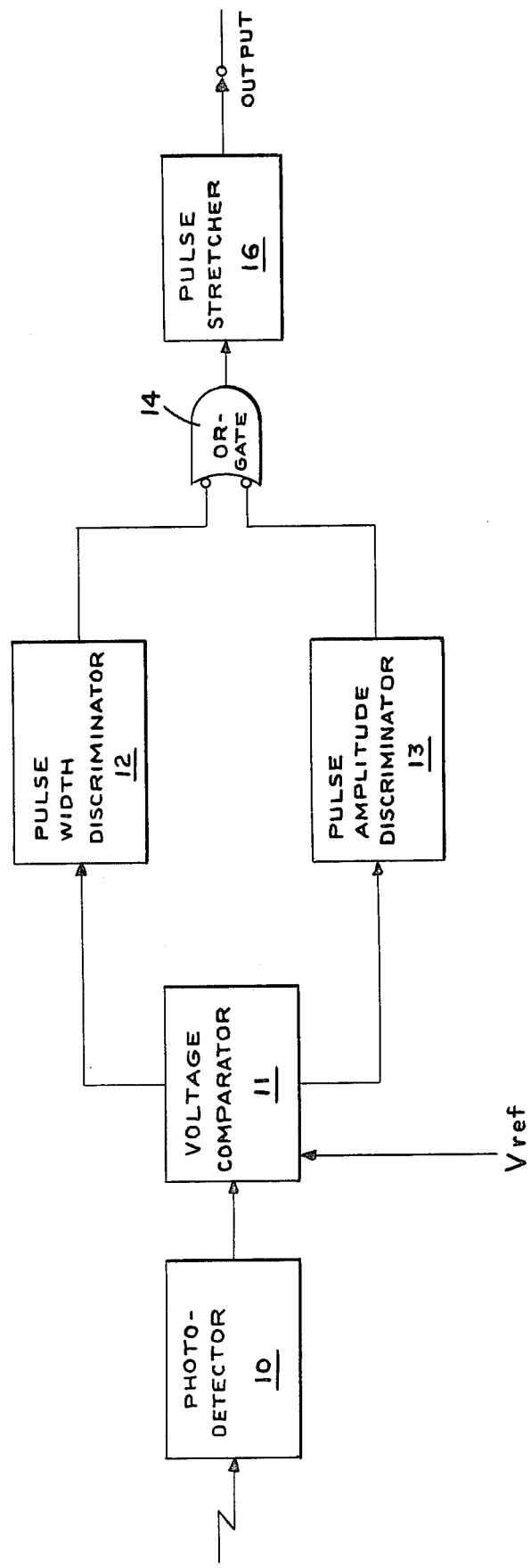
FIG. 1 is a block schematic diagram of an illustrative laser detector, according to the invention.

As shown in FIG. 1, a first illustrative embodiment of the invention comprises a photo-detector 10, for example, a silicon photo-diode, connected to the input of a voltage-comparator 11 thence, to the inputs of a pulse-width discriminator 12 and a pulse-amplitude discriminator 13. The outputs of pulse-width discriminator 12 and pulse-amplitude discriminator 13 are connected to an OR-gate 14 thence, to a pulse-stretcher 16.

In operation, voltage-comparator 11 generates an output signal any time that the output from photo-detector 10 exceeds $V_{ref}$, the pre-set threshold of comparator 11. Illustratively, $V_{ref}$ is set at 10 mVolts, a relatively low level, but nevertheless adequate to provide protection against false operation caused by noise, etc.

Since the duration of the output pulse from a Q-switched laser rarely exceeds 250 nanoseconds, the parameters of discriminator 12 are selected so that discriminator 12 produces an output signal if, and only if, the output from comparator 11 is less than 300 nanoseconds in duration. Assuming that this criterion is met, the output pulse from discriminator 12 is fed to pulse stretcher 16, via OR-gate 14. Pulse stretcher 16 functions to stretch the output of discriminator 12 to some useful duration, 10 $\mu$s, say.

As previously mentioned, if photo-detector 10 happens to receive a "direct hit" from the laser, detector 10 will saturate, generating an output pulse of about 4 volts but having a duration far in excess of 300 nanoseconds. Discriminator 12, which is of course, only sensitive to the duration of the pulses applied thereto and not their amplitude, will incorrectly assume that the radiation impinging on detector 10 is from some source other than a Q-switched laser and will, therefore, not generate any output signal, resulting in error.

The instant invention is based on the assumption that, in a tactical situation, the only radiation source that would be capable of driving detector 10 into saturation is a Q-switched laser; thus, the instant invention uses that assumption to successfully and positively detect Q-switched radiation.

As shown in FIG. 1, this is done by setting the threshold of pulse-amplitude discriminator 13 at a level which is slightly below the saturation level of detector 10. Since the output of discriminator 13 is also connected to pulse-stretcher 16, via another input to OR-gate 14, an output pulse will be generated by pulse-stretcher 16 if detector 10 generates either (a) a narrow pulse of any amplitude (provided it is above the threshold of comparator 11), or (b) a high-amplitude pulse of any duration.

Figure 2:
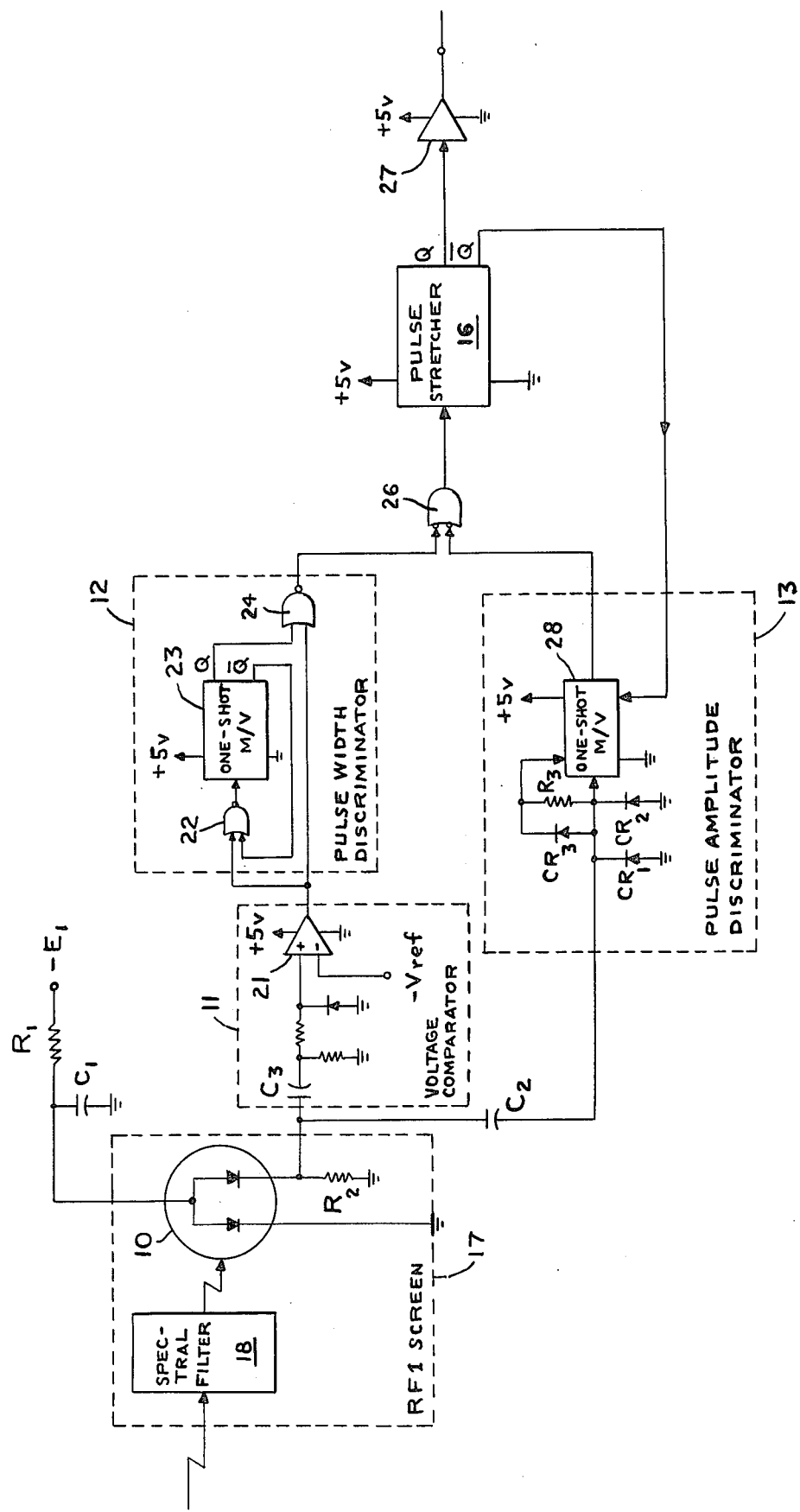
FIG. 2 is a block schematic diagram which depicts the detector shown in FIG. 1 in greater detail.

FIG. 2 depicts the circuitry of an illustrative implementation of the apparatus shown in FIG. 1. As shown, photo-detector 10 is connected between a negative source $E_1$ and ground. Advantageously, photo-detector 10 comprises a silicon photo-diode, for example in EG & G YAG 100, having a sensitivity of 0.5 amps/watt and an area of 5 mm². In the arrangement shown in FIG. 2, such a detector would generate a negative pulse across resistor $R_2$ at a ratio of 5.5 volts per incident watt/cm². A single detector would, of course, have a 90° field of view, thus, to obtain a 360° field of view it is necessary to employ four identical detectors. Advantageously, each detector has an RFI screen 17 and a high-pass spectral filter 18 associated therewith. Because a silicon photo-diode has a cutoff wavelength of about 1.1 μm, the high-pass spectral filter 18 is selected to have a cutoff wavelength of 0.78 μm. Thus, detector 10 is capable of detecting radiation falling within the pass-band 0.78 to 1.1 μm. This pass-band includes the desired 1.06 μm radiation from a Q-switched laser.

The pulse which is developed across $R_2$ is fed to the non-inverting input of a high-speed voltage-comparator 21. The inverting input of comparator 21 receives a reference potential $-V_{ref}$, for example, from some suitable voltage-divider circuit.

If the pulse developed across $R_2$ exceeds $-V_{ref}$, comparator 21 will develop a negative output pulse which is fed to the input of an AND-gate 22, thence, to the trigger input of a one-shot multi-vibrator 23. The Q output from multi-vibrator 23 is fed to a first input of a first OR-gate 24. The other input to OR-gate 24 comprises the output of comparator 21. The $\bar{Q}$ output of multi-vibrator 23 forms the other input to AND-gate 22. One-shot multi-vibrator 23 is selected such that the duration of its output pulse is about 300 nanoseconds, thus, if the output of comparator 21 is greater than 300 nanoseconds, no output pulse can be generated by OR-gate 24. On the other hand, if the duration of the pulse from comparator 21 is less than 300 nonoseconds, signifying that a beam from a Q-switched laser has struck detector 10, a pulse will be fed from OR-gate 24 to a first input of a second OR-gate 26, thence, to the input of pulse stretcher 16. As previously mentioned, pulse-stretcher 16 is used to stretch the duration of the output pulse of OR-gate 26 from 200 nano-seconds seconds, say, to about 10 μSec., which is a much more useful pulse duration. The output of pulse stretcher 16, in turn, is amplified in a line driver 27 which is connected to some suitable indicating device or counter (not shown).

The pulse which is developed across $R_2$ is also connected to the trigger input of a second on-shot multi-vibrator 28; however, as previously discussed, the sensitivity of one-shot multi-vibrator 28 is reduced, e.g. by the use of diodes CR1 and CR2, so that multi-vibrator 28 is triggered only when the output pulse developed across resistor $R_2$ exceeds some predetermined level, for example $-4$ volts. The output from one-shot multi-vibrator 28 is fed to a second input of the second OR-gate 26 and, likewise, will produce an output pulse in OR-gate 26 which is stretched by pulse-stretcher 16 each time that multi-vibrator 28 is triggered.

The RFI screen 17 and spectral filter 18 at the input to photo-detector 10 eliminate much of the noise that would otherwise tend to cause false operation of the detector. It will be noted that the output pulse developed across resistor $R_2$ is coupled to the pulse-width discriminator via a capacitor $C_3$ and to the pulse-amplitude discriminator via a capacitor $C_2$. Thus, DC noise, for example, caused by sunlight striking the detector, is eliminated. On the other hand, light pulses caused by driving through trees with the sun overhead, for example, will be too wide to get through the pulse-width discriminator and too low in amplitude to get through the pulse-amplitude discriminator, again avoiding erroneous detection.

In summary, the two-channel processor technique disclosed and claimed herein provides a wide-dynamic range with a virtually zero false alarm rate. The circuitry is simple, inexpensive, and highly reliable. The detector assemblies were used in several military field tests and proved to be highly reliable in detecting Q-switched, 1.06 μm laser pulses while maintaining a zero false alarm rate in all instances. Prior to the instant invention, there were no known systems that satisfied all the specifications that the detector assembly disclosed and claimed herein does.

One skilled in the art may take various changes and substitutions to the layout of parts shown without departing from the spirit and scope of the invention.

We claim:

1. Apparatus for detecting radiation from a Q-switched laser, which comprises:
    at least one photo-detector for developing a first output signal in response to incident optical radiation;
    means, connected to said photo-detector, for comparing said first output signal with a known reference potential thereby to generate a second output signal if said first output signal exceeds reference potential;
    a pulse width discriminator, connected to the output of said comparing means, for generating a third output signal if said second output signal has a duration which is less than a predetermined time interval;
    a pulse-amplitude discriminator, connected to said comparing means, for generating a fourth output signal if said second output signal exceeds a predetermined amplitude; and
    means, responsive to either said third or said fourth output signal, for generating a fifth output signal indicative of optical radiation from a Q-switched laser, said fifth output pulse generating means generating a pulse having a duration substantially greater than the duration of the pulse generated by said comparing means.

2. The apparatus according to claim 1 wherein said at least one photo-detector comprises a silicon photo-diode.

3. The apparatus according to claim 2, further comprising:
    a high-pass, spectral filter for filtering said optical radiation prior to its impingement on said photo-diode; and
    means for screening said photo-diode from radio frequency interference.

4. The apparatus according to claim 1 wherein said pulse-width discriminator comprises:
    a first AND-gate having an input connected to the output of said comparing means;
    a first one-shot multi-vibrator having a pulse generating duration of less than 300 nanoseconds, the input to said one-shot multi-vibrator being connected to the output of said first AND-gate; and an OR-gate having one input connected to a first output of said first one-shot multi-vibrator and a second input connected to the output of said comparing means, the other input of said first AND-gate being connected to a second output of said one-shot multi-vibrator.

5. The apparatus according to claim 1 wherein said pulse amplitude discriminator comprises:
a second one-shot multi-vibrator having an input connected to the output of said photo-detector; and
means, associated with the input of said second one-shot multi-vibrator, for reducing the sensitivity thereof such that said second one-shot multi-vibrator generates an output signal only for an output signal from said photo-detector exceeding a second predetermined threshold.

6. The apparatus according to claim 5 wherein said means for generating a fifth output signal comprises:
a second OR-gate having one input connected to the output of said first OR-gate and a second input connected to a first output of said second one-shot multi-vibrator;
a pulse-stretching circuit connected to the output of said second OR-gate; and,
a line driver, connected to a first output of said pulse stretcher, for amplifying the output therefrom.

* * * * *